US009113216B2

(12) United States Patent
DeLorme

(10) Patent No.: US 9,113,216 B2
(45) **Date of Patent: *Aug. 18, 2015**

(54) METHODS, COMPUTER PROGRAM PRODUCTS, AND VIRTUAL SERVERS FOR A VIRTUAL COLLABORATIVE ENVIRONMENT

(71) Applicant: AT&T Intellectual Property I, L.P., Atlanta, GA (US)

(72) Inventor: David DeLorme, Stone Mountain, GA (US)

(73) Assignee: AT&T INTELLECTUAL I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/259,739

(22) Filed: Apr. 23, 2014

(65) Prior Publication Data

US 2014/0237530 A1 Aug. 21, 2014

Related U.S. Application Data

(63) Continuation of application No. 11/937,203, filed on Nov. 8, 2007, now Pat. No. 8,739,214.

(51) Int. Cl.

| | |
|---|---|
| *H04N 7/18* | (2006.01) |
| *H04N 21/242* | (2011.01) |
| *H04N 21/4788* | (2011.01) |
| *H04N 21/431* | (2011.01) |
| *H04L 12/18* | (2006.01) |
| *H04N 7/14* | (2006.01) |
| *H04N 21/4223* | (2011.01) |
| *H04N 21/218* | (2011.01) |
| *H04N 21/443* | (2011.01) |

(52) U.S. Cl.
CPC ........ *H04N 21/4788* (2013.01); *H04L 12/1813* (2013.01); *H04N 7/141* (2013.01); *H04N 7/181* (2013.01); *H04N 21/21805* (2013.01); *H04N 21/242* (2013.01); *H04N 21/4223* (2013.01); *H04N 21/4316* (2013.01); *H04N 21/4437* (2013.01)

(58) Field of Classification Search
CPC . H04N 21/4316; H04N 21/242; H04N 7/181; H04N 21/4788; H04L 12/1813
USPC .............................................. 725/43, 97, 131
See application file for complete search history.

(56) References Cited

U.S. PATENT DOCUMENTS

| | | | |
|---|---|---|---|
| 7,317,791 | B2 | 1/2008 | Carlson |
| 7,478,129 | B1 | 1/2009 | Chemtob |
| 7,634,540 | B2 | 12/2009 | Ivashin et al. |
| 7,920,528 | B2 | 4/2011 | Karaoguz et al. |
| 2003/0182428 | A1 | 9/2003 | Li et al. |

(Continued)

*Primary Examiner* — Ricky Chin
(74) *Attorney, Agent, or Firm* — Cantor Colburn LLP

(57) ABSTRACT

Implementation of a virtual service includes connecting a set top box (STB) of a first user to a STB of a second user and a STB of a third user, providing a first video of the first and second users to corresponding STBs, and providing a second video of the first and third users to corresponding STBs. The virtual service also includes displaying the first video on a device of the first user and a device of the second user simultaneously with broadcast content. The virtual service further includes displaying the second video on the device of the first user and on a device of the third user simultaneously with the broadcast content. The displaying is implemented such that the second user and the third user are unaware of the mutual connection to the set top box of the first user.

20 Claims, 3 Drawing Sheets

(56) References Cited

U.S. PATENT DOCUMENTS

| | | | |
|---|---|---|---|
| 2004/0008635 | A1 | 1/2004 | Nelson et al. |
| 2004/0215722 | A1 | 10/2004 | Mukherjee |
| 2007/0271338 | A1 | 11/2007 | Anschutz |
| 2008/0028323 | A1 | 1/2008 | Rosen et al. |
| 2008/0036849 | A1 | 2/2008 | Oh et al. |
| 2009/0019374 | A1 | 1/2009 | Logan et al. |

METHODS, COMPUTER PROGRAM PRODUCTS, AND VIRTUAL SERVERS FOR A VIRTUAL COLLABORATIVE ENVIRONMENT

CROSS-REFERENCE TO RELATED APPLICATION

This application is a continuation of U.S. patent application Ser. No. 11/937,203, filed Nov. 8, 2007, the content of which is incorporated by reference herein in its entirety.

BACKGROUND

Exemplary embodiments relate generally to virtual collaboration, and more particularly, to methods, systems, and computer program products for virtual collaboration while consuming broadcast content.

Television (TV) viewing is in some ways an isolating experience. Viewers are often alone or in a small group. However, television viewing may also be the basis for social gathering, e.g., as people often discuss last night's game or AMERICAN IDOL program around the water cooler or in the car pool.

It would be desirable for television viewing not to be isolating and to have a way for television viewing to lead to a social experience.

BRIEF SUMMARY

Exemplary embodiments include a method for providing virtual service. The method includes receiving input from a first user of the virtual service. The input identifies a second user and a third user in which to operatively connect for the virtual service. The method also includes operatively connecting a set top box of the first user to a set top box of the second user and a set top box of the third user, transmitting and receiving first multimedia video of the first user and the second user between the set top box of the first user and the set top box of the second user, and transmitting and receiving second multimedia video of the first user and the third user between the set top box of the first user and the set top box of the third user. The first multimedia video and the second multimedia video are transmitted and received while common broadcast content is displayed at the set top box of the first user, the set top box of the second user, and the set top box of the third user. The method further includes causing a multiple viewport application executable on each of the set top box of the first user and the set top box of the second user to display the first multimedia video simultaneously with the common broadcast content on a first device communicatively coupled to the set top box of the first user and on a second device communicatively coupled to the set top box of the second user. The method also includes causing the multiple viewport application of the set top box of the first user and a multiple viewport application executable on the set top box of the third user to display the second video simultaneously with the common broadcast content on the first device and on a third device that is communicatively coupled to the set top box of the third user. The first multimedia video and the second multimedia video are displayed such that the second user and the third user are unaware of the mutual connection to the set top box of the first user.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
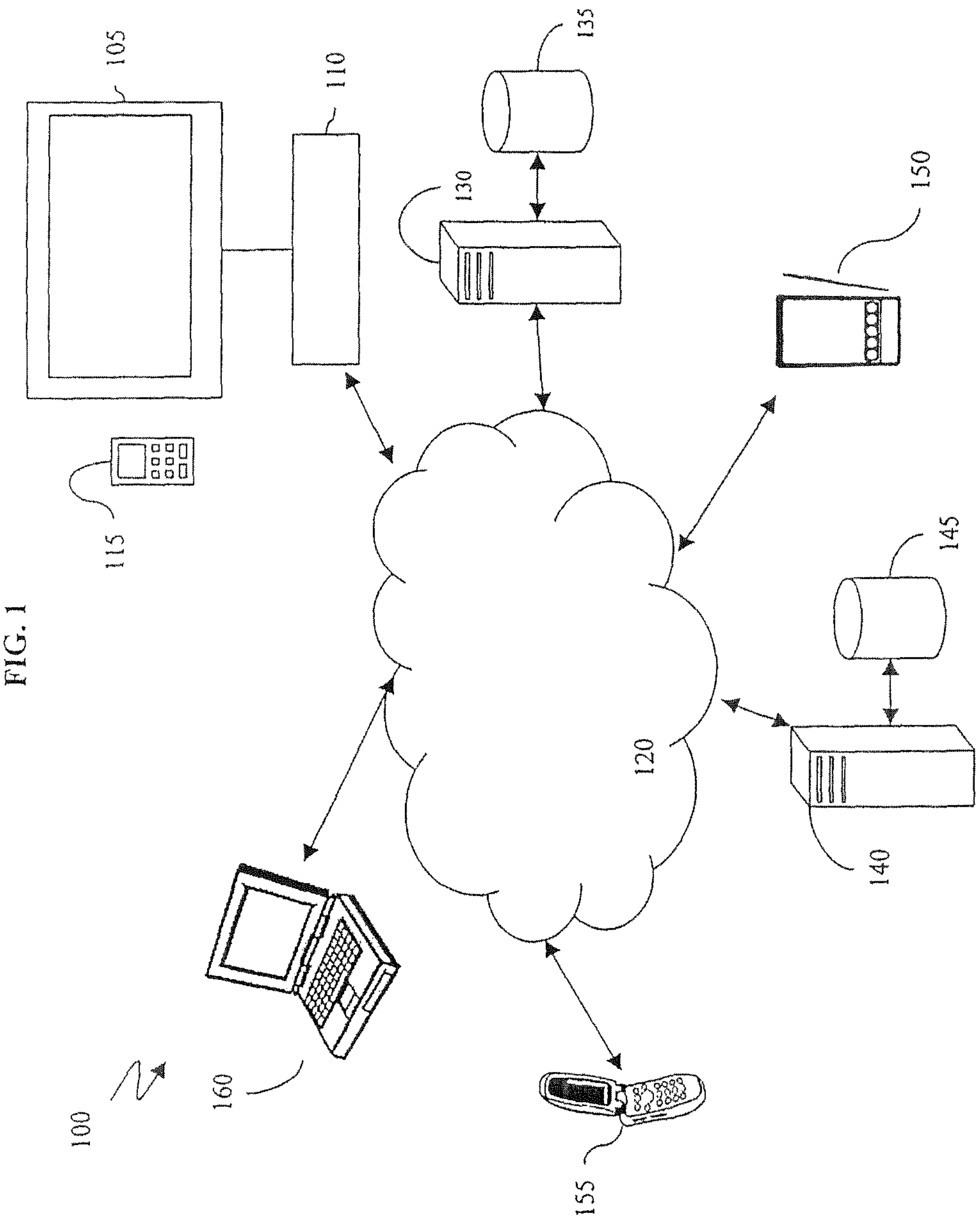
FIG. 1 illustrates a block diagram of a system in which a virtual collaboration service may be implemented in accordance with exemplary embodiments.

FIG. 1 illustrates a block diagram of a system 100 in which a virtual collaboration service may be implemented in accordance with exemplary embodiments. The system 100 may provide an infrastructure through which users can access and enjoy the virtual collaboration service (including video, audio, data, multimedia messaging, etc.) through one or more communications devices 105, such as an IPTV-enabled television and a set top box 110 configuration. The communications device 105 may be separate from or integrated in the same device as the set top box 110. It is understood that in exemplary embodiments and implementations, the communications device 105 can be a variety of other communications devices, such as general purpose or laptop computers, wireless devices such as cellular telephones, portable computing device, digital music players (e.g., MP3 players), and mobile devices. In addition, a wireline public switched telephone network (PSTN) telephone, Session Initiation Protocol (SIP) telephone, dual-mode mobile telephone, personal digital assistant (PDA), or other type of communications device may be included in the system 100 of FIG. 1. As an IPTV network, the system 100 may also include a remote controller 115 for inputting information and controlling the communications device 105 (e.g., an IPTV) and the set top box 110.

The system 100 can manage multiple accounts and subscriptions as established by particular users. These accounts may then be used to provide access to a virtual collaboration services as described further herein.

According to exemplary embodiments, the system 100 includes one or more of the communications devices 105 as discussed above, which can be an IPTV enabled television communicatively coupled to the set top box 110 for accessing a network 120, such as but not limited to the Internet. The network 120 may include circuit-switched and/or packet-switched technologies and devices, such as routers, switches, hubs, gateways (e.g., residential gateways, including a DSL or cable modem), or IP multimedia subsystem (IMS)-based networks for facilitating communications between the communications device 105 and a server 130 (e.g., an authentication server, a virtual service logic server, or a virtual service server). The network 120 may include wireline and/or wireless components utilizing, e.g., IEEE 802.11 standards for providing over-the-air transmissions of communications. The network 120 can be an IP-based network for communication between a customer service center and clients using the communication device 105 via a broadband connection.

According to exemplary embodiments, the network 120 facilitates transmission of media (e.g., images, video, data, audio, etc.), from users/customers, content services provider systems, and others to users/customers via devices, such as the communications device 105, a laptop 160, a mobile phone 155, and a PDA 150, through, e.g., a broadband connection.

In exemplary embodiments, the network 120 can be a managed IP network administered by a service provider, which can control bandwidth and quality of service for the communications discussed herein. The network 120 may be implemented in a wireless fashion, e.g., using wireless protocols and technologies, such as WiFi, WiMax, BLUETOOTH. The network 120 can also be a packet-switched network as a local area network, wide area network, metropolitan area network, Internet network, or other similar type of network environment. The network 120 may be a cellular communications network, a fixed wireless network, a wireless local area network (LAN), a wireless wide area network (WAN), a personal area network (PAN), a virtual private network (VPN), an intranet or other suitable network system, and the network 120 includes equipment for receiving and transmitting signals such as a cell tower and mobile switching center. In exemplary embodiments, the network 120 can also be a circuit-switched network, such as a standard public switched telephone network (PSTN).

As further shown in FIG. 1, a server 140 (which may be a host server, media server, or content provider server) is in communication with the server 130 and the communications device 105 via the network 120. The server 140 is coupled to a storage device 145. The server 140, e.g., may be implemented by a network service provider device, a content service provider device, a media service provider device or other enterprise device. The server 140 may be implemented using a high-speed processing device (e.g., a computer system) that is capable of handling high volume activities conducted via the communications device 105 and other network entities. Similarly, the server 130 may be implemented using a high-speed processing device (e.g., a computer system) that is capable of handling high volume activities conducted via the communications device 105, and other network entities (e.g., the PDA 150, mobile phone 155, and laptop 160) via the network 120.

According to exemplary embodiments, the server 130 may receive requests from the communications device 105, e.g., to establish a virtual services account, to access network services, to access virtual services, etc. The server 130 may implement authentication software for restricting or controlling access to network services provided by the server 130. Also, the server 130 may implement virtual collaborative service logic for operatively connecting, as non-limiting examples, the communications device 105, the PDA 150, the mobile phone 155, and the laptop 160 in a virtual collaborative environment. As non-limiting examples, numerous communications devices 105 may be operatively connected together to interact in a virtual collaborative environment via the server 130. The server 130 may be configured to control the operations and functions of the virtual collaborative environment. The server 130 may be in communication with a customer identity system (CIS) storage device 135, which stores user credentials (e.g., user names, preferences, and passwords).

In accordance with exemplary embodiments, user credentials and/or virtual collaborative service logic can be stored on the communications device 105, set top box 110, PDA 150, mobile phone 155, and laptop 160. As such, the communications device 105, set top box 110, PDA 150, mobile phone 155, and laptop 160 may be configured to control access to the virtual collaborative environment, to control the operations and functions of the virtual collaborative environment, and to cause the various devices to interact in the virtual collaborative environment.

Furthermore, the responsibilities, operations, and functions of the virtual collaborative environment may be shared among network entities, such as among the server 130, communications device 105, set top box 110, PDA 150, mobile phone 155, and laptop 160.

Moreover, exemplary embodiments are not limited to but are capable of being implemented in the system 100 illustrated in FIG. 1. Additionally, the servers 130 and 140 may be representative of numerous, varied servers. The storages devices 135 and 145 may be representative of numerous, varied storages devices. Likewise, the network 120 may be representative of numerous, varied networks. Also, the communications device 105 may be representative of numerous, varied communications devices. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

Additionally, the elements, devices, network entities, etc., discussed herein all contain the necessary software and hardware components to function as described, which include but are not limited to processors, memory, input/output devices, buses, software applications, etc.

Figure 2:
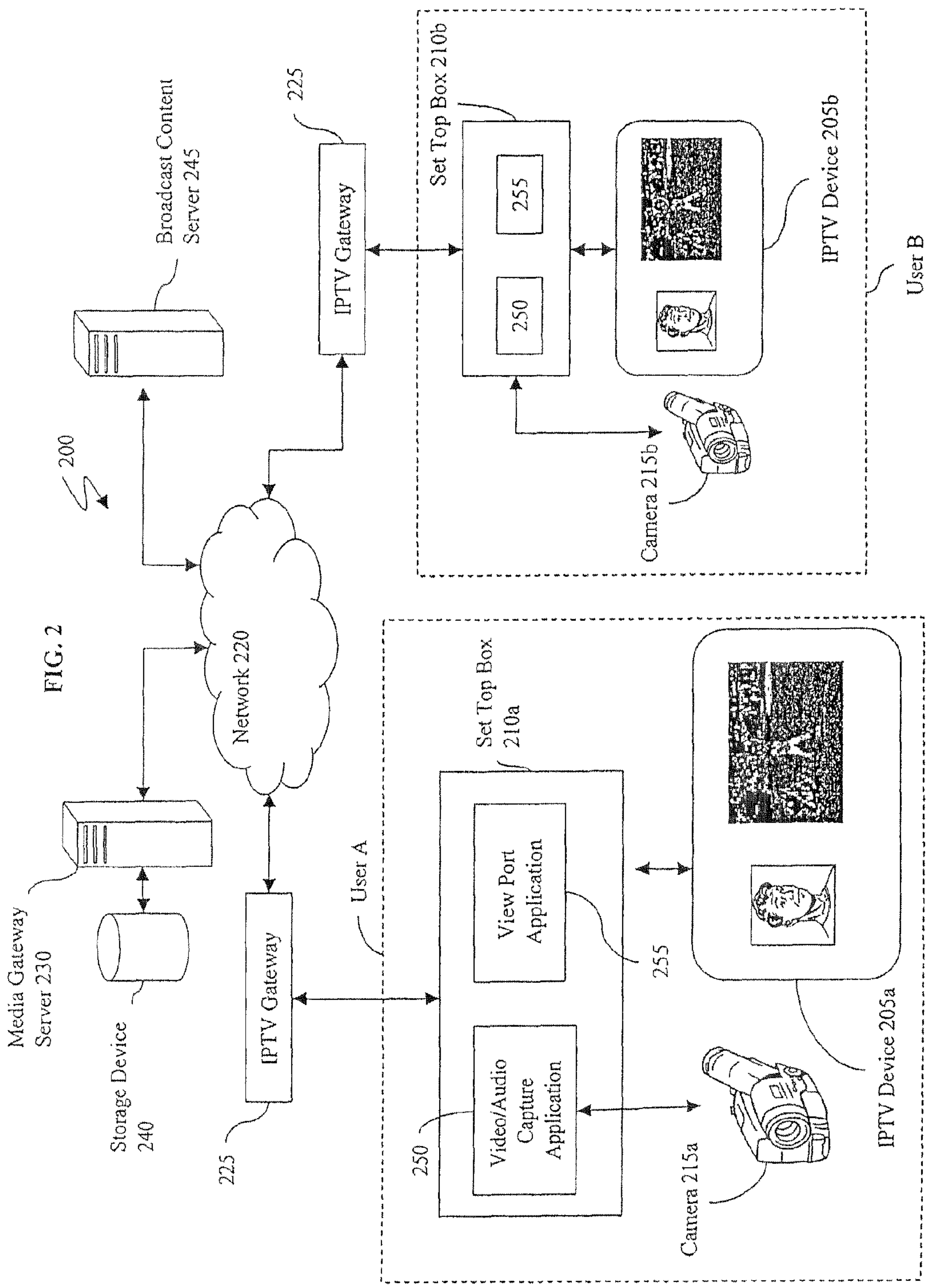
FIG. 2 is an example of an exemplary system that illustrates a source and a target in a virtual collaboration service environment in accordance with exemplary embodiments.

FIG. 2 is an example of an exemplary system 200 that illustrates a source and target in a virtual collaboration service environment in accordance with exemplary embodiments. The system 200 includes an IPTV device 205*a* operatively connected to a set top box 210*a* for accessing a network 220 via an IPTV gateway 225. Conversely, the set top box 210*a* may be omitted, and the IPTV device 205*a* may be configured to include the functions of the set top box 210*a*. The IPTV gateway 225 allows access to the network 220, and the IPTV gateway 225 may reside with an Internet service provider system or a central office.

According to exemplary embodiments, the set top box 210*a* is configured to process multiple viewports having multiple sources in the exemplary embodiments. As non-limiting examples, the set top box 210*a* may be configured to receive inputs from multiple streams of multiple sources via the network 220 or from any other source. The set top box 210*a* may have a multiple view port application 255 that allows the set top box 210*a* to process content received from multiple sources. The view port application 255 may have browser capabilities. As non-limiting examples, the set top box 210*a* may implement Extensible HyperText Markup Language (XHTML), may be XHTML compatible, and/or may implement a remote desktop protocol (RDP). As a non-limiting example, the set top box 210*a* may include the capabilities of an Internet browser enabled set top box. As a non-limiting example, the view port application 255 may include the functions of a media player that is capable of receiving, accessing, and playing various forms of media.

In exemplary embodiments, the set top box 210*a* may include a video and audio capture application 250 for receiving, processing, and transmitting captured video and audio (herein referred to as acquired information). The set top box 210*a* and/or the IPTV device 205*a* may be operatively connected to a camera (which may include a built-in microphone) 215*a*, a microphone, and/or speakers. The camera 215*a* may capture motion pictures (e.g., video) and sound (e.g., audio) of a user A viewing the IPTV device 205*a*. As a non-limiting description of a source, the motion pictures and the sounds captured by the camera 215*a* are processed by a video and audio capture application 250 of the set top box 210*a* in accordance with exemplary embodiments. The processing may include performing formatting and compression schemes on the acquired information. According to exemplary embodiments, the set top box 210*a* transmits the acquired sounds and motion pictures (i.e., acquired information) over the network 220 to a media gateway server 230 (and/or directly to another set top box 210*b*). The media gateway server 230 is configured to receive the acquired information transmitted from the set top box 210*a* and transmit the acquired information to other IPTV devices (like an IPTV device 205*b*) via a set top box (like the set top box 210*b*), in which a user B of the other IPTV device 205*b* can watch and/or hear the acquired information of the user A. Alternatively and/or additionally, in exemplary embodiments, the set top box 210*a* may be configured to transmit the acquired information to the set top box 210*b* of user B, such as, e.g., in a peer-to-peer system or a point-to-point system. As seen in FIG. 2, separate, dashed boxes are used to illustrate the elements for user A and user B. The elements in the dashed box for user B may function identically to the elements in the dashed box for user A.

Further, as a non-limiting example, user A may have a computer (e.g., the laptop 116) that includes the video and audio capture application 250. The computer may also be connected to a camera (e.g., the camera 215*a*), and a microphone for capturing acquired information. The acquired information may be transmitted from the computer (via the network 220 and the IPTV gateway 225), to the set top box 210*b*, such that the acquired information and broadcast content can be displayed on the IPTV device 205*b*.

Also, the media gateway server 230 may be configured to establish a communications connection between user A and user B such that the acquired information can be transmitted to user B (vice versa). Further, the media gateway server 230 may be configured to map communications between user A and user B (and any other users) and/or to set up initial communications such that users A and B may transmit and receive acquired information via their respective set top boxes 210*a*, 210*b* with or without the further assistance of the media gateway server 230. Similarly, the set top boxes 210*a*, 210*b* may be configured to map communications between user A and user B.

As described herein, elements in the system 200 can act as a source for user B receiving the acquired information (e.g., video and audio), and as a target for user A transmitting the acquired information (and vice versa). As a non-limiting example, the user B can view and hear user A (and vice versa), along with a baseball game being broadcast from a broadcast content server 245, on the IPTV device 205*b* in accordance with exemplary embodiments. According to exemplary embodiments, the set top boxes 210*a*, 210*b* are configured to receive inputs of content from the broadcast content server 245 and to receive acquired information from users A and B. The view port application 255 processes and presents both the content from the broadcast content server 245 and the acquired information from user A or B on the IPTV devices 205*a*, 205*b*.

Further, it is contemplated that multiple users may utilize the virtual service described in the system 200 in accordance with the exemplary embodiments. As discussed herein, multiple users may each enjoy, e.g., a baseball game broadcast from the broadcast content server 245, while enjoying the real time or near real time expressions of the others from the acquired information captured by the camera 215*a* and a camera 215*b* associated with user B. As a non-limiting example, the media gateway server 230 may include a conferencing application that streams multiple outputs of acquired information to multiple users, such that each user may view and hear the other users, along with the content being received from the broadcast content server 245. The multiple streams may be received by the set top boxes 210*a*, 210*b* and processed by the view port application 255, so that the acquired information of each user may be displayed (and heard) on the IPTV devices 205*a*, 205*b* of other users. In response to receiving acquired information, the view port application 255 is configured to format (if necessary) the acquired information into a format that is suitable for the IPTV devices 205*a*, 205*b*. In a non-limiting example, the arrangement, size, superposition, of the acquired information may be formatted by the view port application 255 and may be adjusted by the user via the view port application 255. In exemplary embodiments, the view port application 255 may be a thin client that is run on a browser, or the view port application 255 may be a thick client.

In accordance with exemplary embodiments, whether the system 200 is considered as a source or target, the acquired information is capable of being received by various users in real time or near real time. The acquired information may be stored on the media gateway server 230, a storage device 240 coupled to the media gateway server 230, or the set top boxes 210*a*, 210*b*, such that the acquired information may be accessed and displayed at a later time. The acquired information is not limited to video and audio but may include still pictures, text, games, and representations of people, animals, places, or things. The representations may be constructed according to user preferences of the user and be stored in the media gateway server 230 and/or in the set top boxes 210*a*, 210*b*.

In exemplary embodiments, users may subscribe to the virtual collaboration service. As non-limiting examples, the users may subscribe to the virtual service and create a user name and password that can be authenticated by an AAA (Authenticate, Authorization, Auditing) server [not shown]. After authentication, the user may access the virtual service.

In exemplary embodiments, user A may input (via the set top box 210*a* or the IPTV device 205*a*) a unique address (e.g., an IP address, a telephone number, etc.), that corresponds to user B, and user A may request permission to operatively connect with user B for virtual services. User B may accept user A's invitation to operatively connect for virtual service, and respective acquired information can be transmitted between user A and B via the set top boxes 210*a*, 210*b*. As a non-limiting example, user B may accept or decline the invitation to operatively connect using the remote controller 115 (shown in FIG. 1).

Also, each user may be operatively connected to multiple users. Each user may transmit and receive acquired information from other respective users via the set top boxes 210*a*, 210*b*. As a non-limiting example, user A may be operatively connected with user B and a user C. Users B and C may be unaware of their mutual connection to user A. On the other hand, users A, B, and C may all be operatively connected together such that each user is fully aware of and enjoys the acquired information of the others. The acquired information may be transmitted directly to the set top boxes 210*a*, 210*b* of the other users over the network 220. Also, in exemplary embodiments, users A, B, and C may transmit acquired information to the media gateway 230, and the media gateway server 230 can map the acquired information to the respective users. As discussed herein, the acquired information may or may not be transmitted to the media gateway server 230 before being transmitted to the set top boxes 210*a*, 210*b* of the respective users.

Additionally, the user A may have a list of names (which may be stored on the media gateway server 230, the storage device 240, and/or the set top box 210*a*) of users to which the user A may want to operatively connect. The user A may select user B, and, in response, the set top box 210*a* or the media gateway server 230 automatically maps to the user B and sends an invitation requesting permission to operatively connect for virtual services. The user B may choose to accept the invitation to operatively connect, and a communications connection is established between user A and user B such that acquired information can be transmitted between the respective set top boxes 210*a*, 210*b*.

As discussed herein, the initial set up for operatively connecting for virtual services may utilize the media gateway server 230, and the transmission of acquired information can be performed directly between the set top boxes 210*a*, 210*b* of users A and B. Also, the media gateway server 230 may be utilized continuously during the operative connection for routing or mapping the acquired information to the proper destination or for monitoring the operative connection between users A and B. Further, in exemplary embodiments, the services of the media gateway server 230 may be omitted, and the services of the media gateway server 230 may be integrated in the set top boxes 210*a*, 210*b*.

Figure 3:
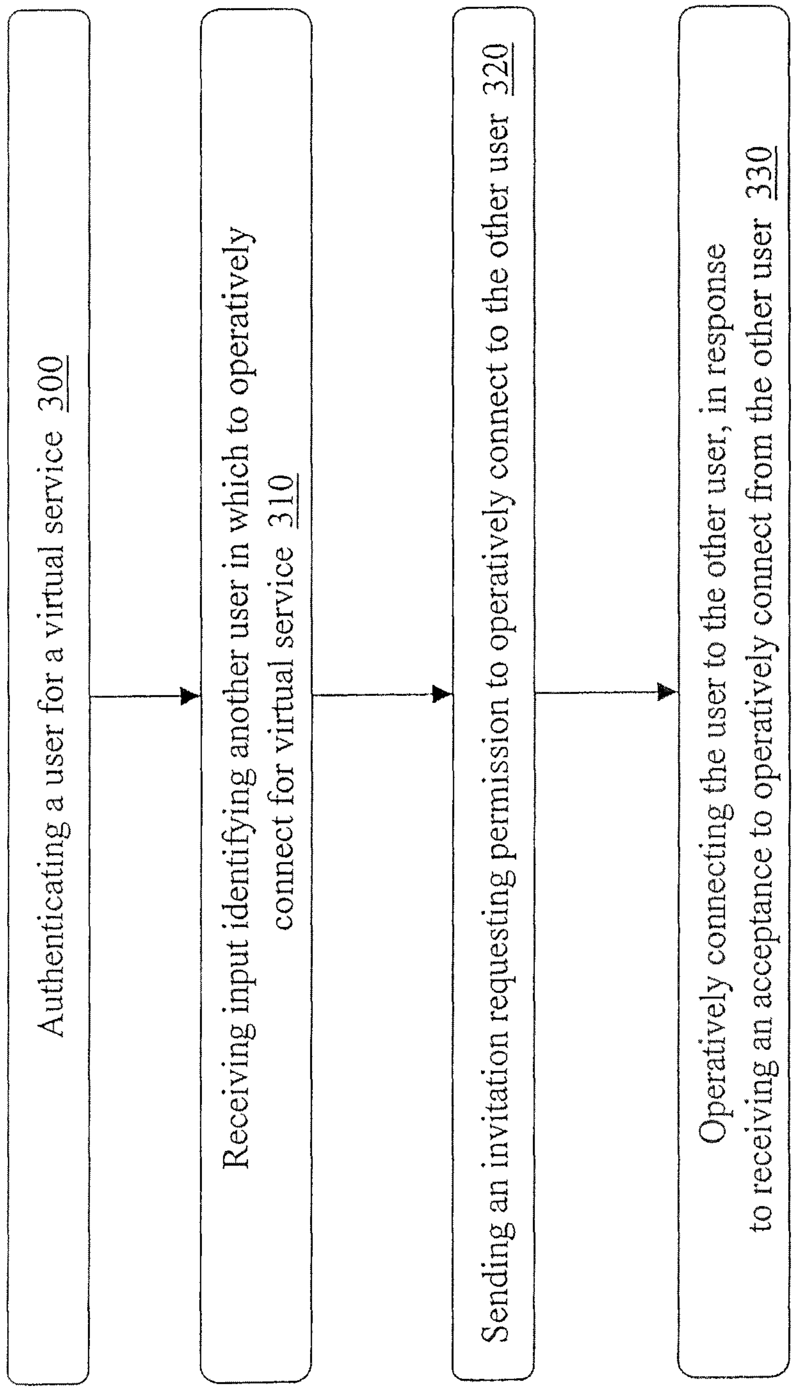
FIG. 3 is a method for providing a virtual collaborative service in accordance with exemplary embodiments.

FIG. 3 illustrates a method for providing a virtual service in accordance with exemplary embodiments. In exemplary embodiments, a user is authenticated for a virtual service at step 300. As a non-limiting example, the user may be authenticated by an AAA (Authenticate, Authorization, Auditing) server. It is understood that a user may subscribe to the virtual service, and the user may create a username, password, and/or unique address. The user may initiate the virtual service by, e.g., selecting a virtual service item from a menu, clicking an icon, inputting the username & password, inputting a code, etc. To utilize the virtual service, the user may be authenticated (after inputting a username and password).

Input identifying another user in which to operatively connect for virtual service may be received (by the media gateway server 230) at step 310. The input may be a unique address of the other user that the user desires to operatively connect. The unique address may be an IP address or identification created by the media gateway server 230. Also, the unique address may be a telephone number, be similar to a telephone number, and/or be correlated with a telephone number. As such, the user may be able to input the telephone number of another person who has subscribed to the service, and the media gateway 230 can correlate the telephone number to the unique address of the person. Also, the user may select names from a list or input a telephone number.

An invitation may be sent to the other user requesting permission to operatively connect to the other user at step 320. As non-limiting examples, the set top box 210*a* or the media gateway server 230 maps to the other user and sends the invitation requesting permission to operatively connect with the user for virtual service. The other user may accept or decline the request to operatively connect for virtual services using the remote controller 115.

The user is operatively connected to the other user for virtual service, in response to receiving an acceptance to operatively connect from the other user at step 330. As a non-limiting example, in response to the acceptance, the set top box 210*a* of the user is operatively connected to the set top box 210*b* of the other user for communications, such that acquired information can be transmitted and received between the two while content is being broadcast from broadcast content server 245.

In exemplary embodiments, the user may operatively connect to multiple users and vice versa, and the users may or may not be aware of the operative connections of other users.

The set top box 210*a*, the IPTV device 205*a*, and the media gateway server 230 include all the necessary software and hardware to operate and function in accordance with the exemplary embodiments. Although certain responsibilities and functions have been designated to certain elements, it is understood that functions and responsibilities may be combined and implemented in more or fewer elements.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing a virtual service, comprising:

receiving input from a first user of the virtual service, the input identifying a second user and a third user in which to operatively connect for the virtual service;

operatively connecting a set top box of the first user to a set top box of the second user and a set top box of the third user;

transmitting and receiving first multimedia video of the first user and the second user between the set top box of the first user and the set top box of the second user;

transmitting and receiving second multimedia video of the first user and the third user between the set top box of the first user and the set top box of the third user, the first multimedia video and the second multimedia video transmitted and received while common broadcast content is displayed at the set top box of the first user, the set top box of the second user, and the set top box of the third user;

causing a multiple viewport application executable on each of the set top box of the first user and the set top box of the second user to display the first multimedia video simultaneously with the common broadcast content on a first device communicatively coupled to the set top box of the first user and on a second device communicatively coupled to the set top box of the second user; and causing the multiple viewport application of the set top box of the first user and a multiple viewport application executable on the set top box of the third user to display the second video simultaneously with the common broadcast content on the first device and on a third device that is communicatively coupled to the set top box of the third user, the first multimedia video and the second multimedia video displayed such that the second user and the third user are unaware of the mutual connection to the set top box of the first user.

2. The method of claim 1, further comprising providing an option via the multiple viewport application to adjust a format of the first multimedia video by the first user, the format subject to adjustment including arrangement, size, and superposition.

3. The method of claim 1, further comprising mapping to the second user and the third user.

4. The method of claim 1, wherein in response to a selection from a list stored on the set top box of the first user, the set top box of the first user maps to the set top box of the second user, such that the first multimedia video can be transmitted and received.

5. The method of claim 1, wherein a virtual server maps the set top box of the first user to the set top box of the second user and the set top box of the third user, such that first multimedia video and the second multimedia video can be transmitted and received.

6. The method of claim 1, further comprising:

authenticating the first user for the virtual service; and requesting permission to operatively connect the set top box of the first user to the set top box of the second user and the set top box of the third user;

wherein the operatively connecting the set top box of the first user to the set top box of the second user and the set top box of the third user is implemented in response to receiving an acceptance, by the set top box of the second user and the set top box of the third user, to operatively connect.

7. The method of claim 6, wherein the receiving input identifying the second user in which to operatively connect comprises receiving a unique identification address of the second user.

8. The method of claim 6, wherein the receiving input identifying the second user in which to operatively connect comprises:

receiving a telephone number of the second user;

correlating the telephone number to determine a unique address of the second user; and mapping to the second user based on the unique address.

9. The method of claim 6, wherein the requesting permission to operatively connect to the second user allows the second user to accept or decline the request to operatively connect for the virtual service.

10. The method of claim 1, wherein the operatively connecting the set top box of the first user to the set top box of the second user establishes a communications connection such that the first multimedia video is transmitted, at the same time the common broadcast content is transmitted, to the first device communicatively coupled to the set top box of the first user and to the second device communicatively coupled to the set top box of the second user.

11. A virtual server for providing a virtual service, comprising:

a processor; and memory comprising computer-executable instructions that, when executed by the processor, cause the processor to perform operations comprising:

receiving input from a first user of the virtual service, the input identifying a second user and a third user in which to operatively connect for the virtual service;

operatively connecting a set top box of the first user to a set top box of the second user and a set top box of the third user;

transmitting and receiving first multimedia video of the first user and the second user between the set top box of the first user and the set top box of the second user;

transmitting and receiving second multimedia video of the first user and the third user between the set top box of the first user and the set top box of the third user, the first multimedia video and the second multimedia video transmitted and received while common broadcast content is displayed at the set top box of the first user, the set top box of the second user, and the set top box of the third user;

causing a multiple viewport application executable on each of the set top box of the first user and the set top box of the second user to display the first multimedia video simultaneously with the common broadcast content on a first device communicatively coupled to the set top box of the first user and on a second device communicatively coupled to the set top box of the second user; and causing the multiple viewport application of the set top box of the first user and a multiple viewport application executable on the set top box of the third user to display the second video simultaneously with the common broadcast content on the first device and on a third device that is communicatively coupled to the set top box of the third user, the first multimedia video and the second multimedia video displayed such that the second user and the third user are unaware of the mutual connection to the set top box of the first user.

12. The virtual server of claim 11, wherein the operations further comprise providing an option via the multiple viewport application to adjust a format of the first multimedia video by the first user, the format subject to adjustment including arrangement, size, and superposition.

13. The virtual server of claim 11, wherein the operations further comprise mapping to the second user and the third user.

14. The virtual server of claim 11, wherein in response to a selection from a list stored on the set top box of the first user, the set top box of the first user maps to the set top box of the second user, such that the first multimedia video can be transmitted and received.

15. The virtual server of claim 11, wherein a virtual server maps the set top box of the first user to the set top box of the second user and the set top box of the third user, such that first multimedia video and the second multimedia video can be transmitted and received.

16. The virtual server of claim 11, wherein the operations further comprise:

authenticating the first user for the virtual service; and requesting permission to operatively connect the set top box of the first user to the set top box of the second user and the set top box of the third user;

wherein the operatively connecting the set top box of the first user to the set top box of the second user and the set top box of the third user is implemented in response to receiving an acceptance, by the set top box of the second user and the set top box of the third user, to operatively connect.

17. The virtual server of claim 16, wherein the receiving input identifying the second user in which to operatively connect comprises receiving a unique identification address of the second user.

18. The virtual server of claim 16, wherein the receiving input identifying the second user in which to operatively connect comprises:

receiving a telephone number of the second user;

correlating the telephone number to determine a unique address of the second user; and mapping to the second user based on the unique address.

19. A non-transitory computer readable medium for providing a virtual service, the non-transitory computer readable medium including instructions that, when executed by a computer, cause the computer to perform operations comprising:

receiving input from a first user of the virtual service, the input identifying a second user and a third user in which to operatively connect for the virtual service;

operatively connecting a set top box of the first user to a set top box of the second user and a set top box of the third user;

transmitting and receiving first multimedia video of the first user and the second user between the set top box of the first user and the set top box of the second user;

transmitting and receiving second multimedia video of the first user and the third user between the set top box of the first user and the set top box of the third user, the first multimedia video and the second multimedia video transmitted and received while common broadcast content is displayed at the set top box of the first user, the set top box of the second user, and the set top box of the third user;

causing a multiple viewport application executable on each of the set top box of the first user and the set top box of the second user to display the first multimedia video simultaneously with the common broadcast content on a first device communicatively coupled to the set top box of the first user and on a second device communicatively coupled to the set top box of the second user; and causing the multiple viewport application of the set top box of the first user and a multiple viewport application executable on the set top box of the third user to display the second video simultaneously with the common broadcast content on the first device and on a third device that is communicatively coupled to the set top box of the third user, the first multimedia video and the second multimedia video displayed such that the second user and the third user are unaware of the mutual connection to the set top box of the first user.

20. The non-transitory computer readable medium of claim 19, wherein the operations further comprise:

authenticating the first user for the virtual service; and requesting permission to operatively connect the set top box of the first user to the set top box of the second user and the set top box of the third user;

wherein the operatively connecting the set top box of the first user to the set top box of the second user and the set top box of the third user is implemented in response to receiving an acceptance, by the set top box of the second user and the set top box of the third user, to operatively connect.

* * * * *